July 5, 1932.  J. M. HART ET AL  1,866,408
FOOD PACK
Filed Nov 11, 1929   2 Sheets-Sheet 2
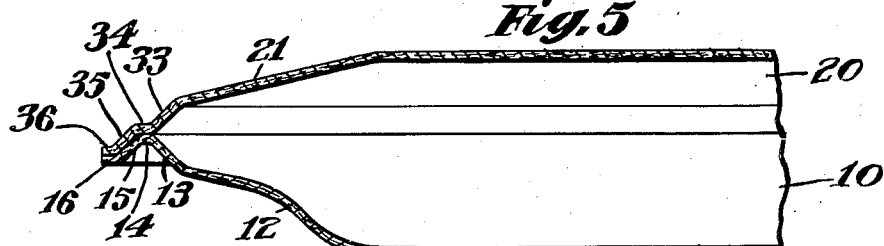
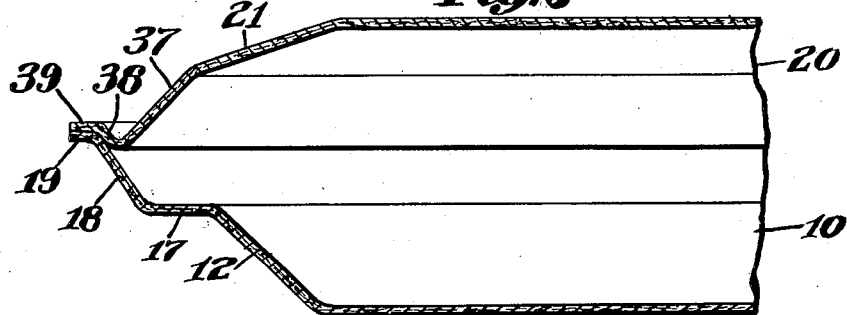
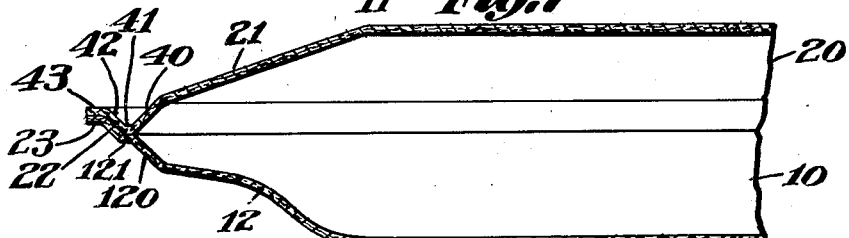
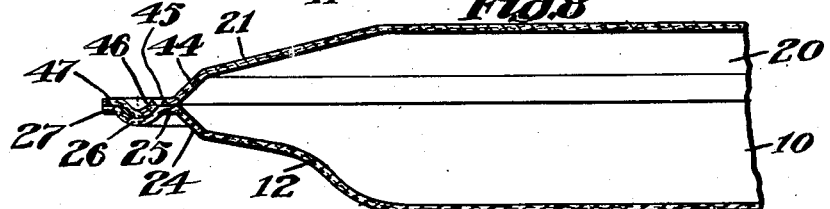
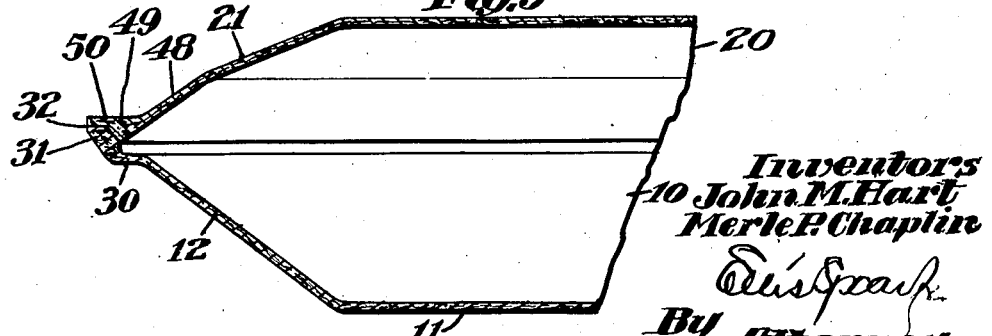
Inventors
John M. Hart
Merle P. Chaplin
By Attorney Patented July 5, 1932

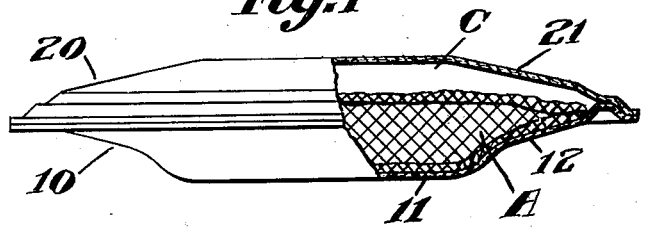
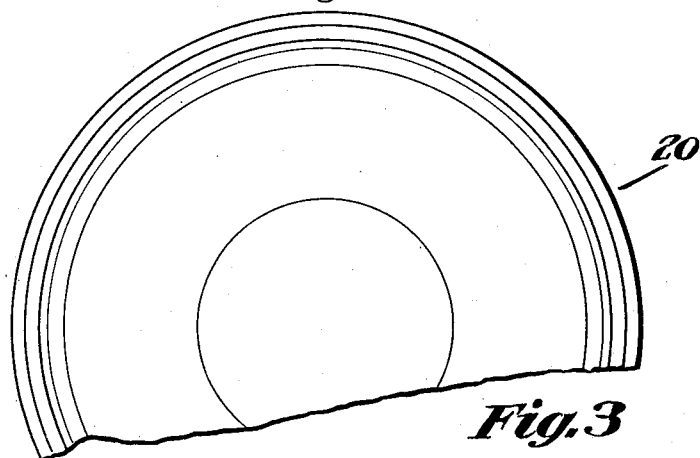
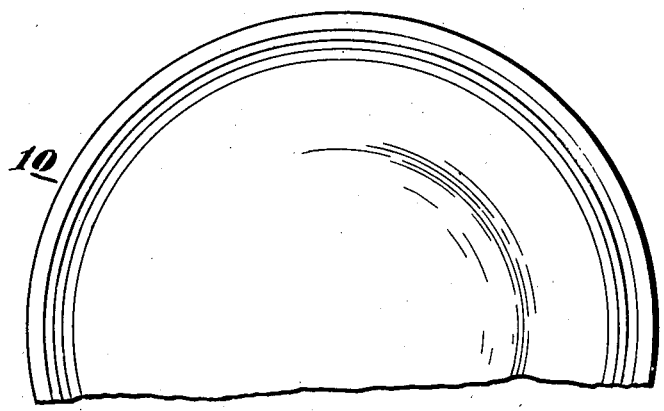
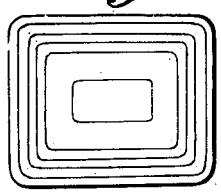

1,866,408

UNITED STATES PATENT OFFICE

JOHN M. HART, OF NEW YORK, N. Y., AND MERLE P. CHAPLIN, OF WATERVILLE, MAINE, ASSIGNORS, BY MESNE ASSIGNMENTS, TO FIDELITY TRUST COMPANY, TRUSTEE, OF PORTLAND, MAINE, A CORPORATION OF MAINE

FOOD PACK

Application filed November 11, 1929. Serial No. 406,257.

There are many kinds of food products which are cooked in one baking vessel or tin and subsequently transferred to a secondary container for storage, display or delivery. In the case of certain products, such as those of bakery origin, notably pies, there is a definite need of post baking treatment or tempering, such as the absorption of excess grease used in the original baking pan and the release of heat factors. There is also in the case of the hot pie or the like a certain escape as of hot gases or vapors which must be allowed to escape or the pie or other produce will be soggy.

Also, if the food product is to reach the ultimate consumer without being damaged and in satisfactory condition, the service container into which it is transferred after being cooked must afford proper protection to the food article during storage, display and delivery.

There are many varieties of food products which are included in the above class, but for purpose of discussing this particular invention the American type of pie is selected as illustrative of what this invention has accomplished.

The usual practice of preparing a pie for baking is to place a pastry lining or lower crust in the metal plate or dish in which the pie is to be baked, then fill this lower crust with whatever material is to be used as the pie filling, and afterwards cover this filling with a second layer or crust which is joined to the first at the edge of the pie.

It is customary to shear off the edge of both the lower and the upper crust around the edge of the metal baking dish in which the pie is baked. After baking the pie is complete as far as cookery is concerned. It has become a definite article but is not yet a commercial product. After baking it is necessary that both the upper and the lower crust be maintained intact particularly as to its marginal seam to retain the appearance and quality of the pie itself.

In bakery practice, it is necessary or at least desirable to remove the fresh baked pie while still hot from its original baking tin. If not removed promptly the incident grease and leakage of the filling is apt to cement the pie to the tin and make its removal difficult and edge breakage liable to occur. If removed promptly while hot and pliable there is a minimum of breakage.

Also, in bakeries, it is desirable that the baking tins be released, washed and promptly made ready for the next baking and delays in cooking necessitate a large investment in metal ware as well as a lack of proper tempering as to grease and moisture during the cooking period.

In former secondary receptacles the edge or crust of the pie projected out to the edge of the secondary container and in case the pie was not placed in the secondary container evenly it projected over the side. This left the edge or crust of the pie exposed to damage in handling or storage, and made it difficult to merchandise pies without damage to the edge of the crust.

Where cooked articles of food, as pies and pastries, are placed in covered containers while still warm it has been necessary to provide perforations in the cover through which moisture or vapor from the food may escape in order to prevent the articles of food from becoming heavy or soggy. The presence of such perforations introduced a factor making for contamination in that such perforations while permitting the escape of the moisture or vapor from the food nevertheless allowed the entrance of dirt and other foreign matter into the container or permitted the leakage of juices.

Our invention has for its purpose to provide a covered container which will receive and temper the hot newly baked pie and afford complete and adequate protection to it during storage and delivery. Our concept provides articles of such simple design and of such low cost that both container and cover can be discarded after a single use. Such a container also affords in addition to its tempering function a simple dust and dirt proof receptable in which the food can be placed and by means of which it can be delivered fully protected and in the best possible condition to the consumer.

As above suggested with such a product as a pie, it is desirable that the dispenser or secondary container, as distinguished from the cooking vessel or tin, absorb any surplus moisture, grease, and permit the escape of vapors which may be given off.

For this purpose we employ for the material of the container or cover, or both, a material of a high absorptive nature and for such we utilize wood pulp composition.

Such material may be made not only to absorb the surplus moisture, grease or vapor, preventing the food from becoming heavy or soggy, or from making damp, sticky and moist such parts of the food as should be crisp or flaky, but will retain the natural flavor of the food without danger of outside contamination.

In the accompanying drawings we have shown preferred embodiments of our invention.

In the drawings:

Fig. 1 is an elevation partly in section, showing a pie packaged in accordance with our invention.

Fig. 2 is a fragmentary plan, particularly showing the top or cover member of our pack.

Fig. 3 is a view similar to Fig. 2 and showing the bottom or supporting member of our pack.

Fig. 4 is a plan view showing a contemplated variation in pack shape wherein the pack is oblong rather than round, and Figs. 5 to 9 inclusive are fragmentary sections showing modifications in edge design.

In these drawings we have indicated at 10 an imperforate bottom member later to be described and at 20 an imperforate cover member which may be seated upon 10 to constitute a container and to define an enclosed chamber for a food article A.

The receiving member 10 regarded as a container is of absorbent material such as wood fibre in which the fibre bundles have been loosened to render them of high absorptivity.

The top member 20 is of wet laid fibre and of porous character adapted to withstand leakage but yet permeable to steam and other vapors from the hot pie.

In the form shown in Figs. 1 and 5 the receiving or bottom member 10 as here shown is shaped to receive a previously cooked pie. It is capable of absorbing any juice, moisture or grease exuding or escaping from the pie or other article of food A placed therein. At the same time it provides sufficient strength to bottom the package.

As shown in Fig. 5 it presents a relatively flat bottom 11 and an outwardly directed radially retaining annular wall 12 which is extended as a substantially flat edge as is common in plates and terminates in an upturned protective annulus. This may be variously formed to provide a marginal enclosing frame and also where a cover is used to give an interlock or fastening member.

As a novel factor we may provide an additional safeguard by making the outer portion of the container somewhat thicker. This is not only a strengthening factor to resist radial pressures but is an additional absorbent factor.

The side wall 21 of the cover member 20 is inclined downwardly and outwardly relative to the upwardly and outwardly inclined side wall 12 of the bottom member 10 of the package and opposite the protective annulus of said wall 12 is bent upon itself to provide a self-centering seating portion adapted to seat and automatically to center itself on said portion and to be wholly supported thereon without contact with the edge of the pie or other food article A and in protecting relation to its edge.

Referring to the form shown in Fig. 5 the bottom member beyond its wall 12 continues as a protective annulus as before generally described. In the forms shown the protective annulus of the bottom member is constituted by an upwardly and outwardly extending portion 13 disposed in non-parallel relation to the side wall 12, a relatively flat horizontal portion 14, and a downwardly and outwardly extending portion 15 of opposite angle to the portion 13 and terminating in an out-turned substantially horizontal edge 16. (Fig. 5.)

In the form of Fig. 6, such protective annulus is constituted by a substantially horizontal portion 17 and an upwardly and outwardly extending portion 18 disposed in non-parallel relation to the side wall 12 and terminating in an out-turned substantially horizontal edge 19.

In the form of Fig. 7, such protective annulus is constituted by an upwardly and outwardly extending portion 120 disposed in non-parallel relation to the side wall 12, a relatively flat horizontal portion 121, and an upwardly and outwardly extending portion 22 terminating in an out-turned substantially horizontal edge 23.

In the form of Fig. 8, such protective annulus is constituted by an upwardly and outwardly extending portion 24 disposed in nonparallel relation to the side wall 12, a relatively flat horizontal portion 25, and a downwardly and outwardly extending portion 26 which is formed as an annular channel and terminates in an out-turned substantially horizontal edge 27.

In the form of Fig. 9, such protective annulus is constituted by a horizontally extending portion 30 and a vertically extending portion 31 terminating in an out-turned substantially horizontal edge 32.

The edges of the tops and bottoms may, if desired, be positively interlocked with each other to hold the members together although this is not ordinarily necessary since their abutment affords a continuous bearing surface of the members on each other which prevents ordinary displacement and the ingress of any foreign matter into the pack at its peripheral edge. Inasmuch as both top and bottom members are imperforate, the entrance of foreign matter elsewhere is of course impossible.

Moreover, the taper flange interlock results in the cover automatically centering itself on the container and prevents any gapping or opening up of cover and container at its edge as well as affording a natural arch support for the cover against collapse.

There is sufficient space beyond the normal edge of the pie or other food article for the cover member to seat without bearing on the top crust or any part of the pie itself to the detriment of the pie. The cover may be, but is not necessarily, secured by any extraneous fastening means as sealing tapes, clips, or the like. Thus the removal of the cover for the purpose of inspecting the food article may be accomplished with the minimum effort and the package afterwards closed again by simply replacing the cover.

As previously stated that being formed of moulded pulp of special composition, the cover is permeable by any vapors and is also grease and moisture absorbent to take care of any exudations from the pie that may reach it. While the cover member may be variously shaped we prefer that its shape be such as to define when placed on the bottoming member the expansion chamber C for the steam or vapors given off by the pie or other article of food A as well as to cover the food article without actual contact therewith.

The bearing of the edges of the top and bottom members on each other provides a continuous closure of the package all around its perimeter although where a more positive seal is desired, the rim edges may be interlocked with each other as by crimping, stapling, or otherwise.

For ordinary purposes the bearing of the edges on each other in combination with the interengagement is sufficient to prevent relative displacement of the pack members, but if desired, this bearing may be further supplemented as by stapling, or by application of a sealing tape or other securing means across or around the complete package as above suggested.

We have also shown in Fig. 9 a thickening of the flange of the edge member which gives added strength and absorptivity to the protective annulus at the plane of greatest liability to damage. This feature may be embodied in any form of either cover or bottom members.

The cover member may be variously formed to afford the self-centering seating action heretofore described. In the form shown in Fig. 5, the self-centering seating projection was constituted by a downwardly and outwardly inclined portion 33, a substantially horizontal portion 34 and a downwardly inclined portion 35 disposed substantially parallel to the portion 33 and terminating in an out-turned horizontal edge 36 disposed substantially parallel to the horizontal portion 34. In this form the portion 34 bears on the portion 14 of the bottom member and the portions 35 and 36 bear on the corresponding portions 15 and 16 of the bottom member.

In the form of cover shown in Fig. 6 such self-centering seating projection is constituted by a downwardly and outwardly inclined portion 37 which is bent upwardly upon itself as indicated at 38 and terminates in a horizontally disposed edge 39. The portion 38 has bearing upon the underlying portion 18 of the bottom member and the portion 39 bears on the underlying portion 19 of the bottom member.

In the form shown in Fig. 7 such self-centering seating projection is constituted by a downwardly and outwardly inclined portion 40, a horizontally disposed portion 41 and upwardly and outwardly inclined portion 42 and a horizontally disposed edge portion 43. The portion 41 bears on the underlying horizontal portion 121 of the bottom member and the portions 42 and 43 bear on the corresponding portions 22 and 23.

In the form of Fig. 8, such self-centering seating projection is constiuted by a downwardly and outwardly inclined portion 44, a horizontal portion 45, and a downwardly and outwardly extending portion 46 shaped to provide a channel bead and terminating in an out-turned substantially horizontal edge 47. The portions 45, 46 and 47 of the cover member bear on the corresponding underlying portions 25, 26 and 27 of the bottom member.

In the form of Fig. 9 such self-centering seating projection is constituted by a downwardly and outwardly inclined portion 28 and a vertically extending portion 49 terminating in an out-turned substantially horizontal edge 50. The portion 49 abuts the underlying portion 31 of the bottom member and the out-turned edge 50 rests flatly on the out-turned edge 31 of said bottom member.

Various other modifications in structure and relationship may be obviously resorted to within the spirit and scope of our invention as defined by the appended claims.

What we therefore claim and desire to secure by Letters Patent is:

1. As a single-service fibre pack for a previously cooked pie or the like, a bottom member including an absorbent receiving portion adapted to receive the article and a flange extending outwardly and thence upwardly in protective relation to the upper edge of the food article, and an overlying cover member having a seating portion disposed for marginal interlock with said flange beyond the upper edge of said food article and out of contact therewith.

2. As a single-service absorbent fibre pack for a previously cooked pie or the like, a bottom member including a receiving portion adapted to receive the article and an outwardly extending flange disposed in protective relation to the upper edge of the food article, and constituting a means adapted automatically to center and lock an overlying cover member thereon, and an overlying cover member having a seating portion disposed for marginally interlocking bearing on said centering means beyond the upper edge of said food article and out of contact therewith.

3. A service container for protecting a pie or like contoured cooked article of food contoured to a predetermined bake tin consisting of a recessed container portion adapted to contain the article, and an integral reinforcing annulus disposed about the container in protective relation to the upper edge portions of the article of cookery lodged in the container portion, and a cover member disposed over said container and having a side wall disposed out of contact with the edge of the article of cookery and terminating in a reinforced marginal portion adapted to interlock with said annulus.

4. A porous fibre cover for an open top container for pies or like articles of cookery comprising a top member having a downwardly and outwardly extending side wall disposed out of contact with the food article, having a projection portion disposed below the plane of the side wall and terminating in an outwardly extending edge.

5. A top member for a pie pack comprising a molded member of unsized fibre having a downwardly and outwardly extending side wall disposed out of contact with the food article, including an annular portion depending below the plane of the side wall and terminating in an outwardly extending edge.

6. A pack for a pie or like contoured article of food comprising a container having a bottom portion and an integral angularly bent reinforcing annulus disposed about the container in protective relation to the article lodged in said container, said annulus constituting an automatic centering and locking device for a superposed cover, and a cover having a marginal centering bead disposed for interlocking engagement with said annulus and beyond and out of contact with the upper edge of the article within said container.

7. A pack for a pie or like contoured article of food comprising a container having a bottom wall and an upwardly extending side wall terminating in an angularly bent reinforcing annulus disposed beyond the edge of the article contained within said container, and a cover having a top wall, and a downwardly extending side wall terminating in a centering and locking projection adapted automatically to seat on and interlock with said annulus of the container and center the cover thereon beyond and out of contact with the upper edge of the food article within said container.

8. A pack for a pie or like contoured article of food comprising a container having a bottom wall and an upwardly extending side wall terminating in an angularly bent reinforcing annulus disposed beyond the edge of the article contained within said container, and a cover having a top wall, and a downwardly extending side wall terminating in a centering and locking projection adapted automatically to seat on and interlock with said annulus of the container and center the cover thereon, said top, side and centering projection being beyond and out of contact with the upper edge of the enclosed article in said container.

9. For use with a food container having a bottom, a side wall, and an angled reinforcing annulus constituting a protective edge for the food and a marginal stiffening encirclement for the container, a cover inclusive of a reversely angled marginal portion adapted to interlock with said reinforcing annulus of the container beyond and out of contact with the upper edge of the food article.

10. For use with a pie plate having an annular protective edge disposed beyond the upper edge of the pie, a cover inclusive of an annular seating portion adapted to interlock with said protective edge and secure the cover against accidental displacement relative to the container.

11. A cover for a pie plate having a protective edge of angular cross-section, comprising an area overlying the body portion of the pie plate, and an annular seating portion conforming to the angularity of said protective edge and adapted to be seated thereon from above and to interlock therewith whereby to secure the cover against accidental displacement relative to the container.

12. As a pack for a pie or like contoured article of food, a bottom member including a receiving portion adapted to contain the food article, said receiving portion having a flange extending outwardly and thence upwardly therefrom and constituting a protective edge for the article of food, a marginal reinforcement for the bottom member of the pack, and an automatic centering and locking device for the overlying cover member, and a cover member inclusive of an annular portion adapted to be centered on and interlocked with said flange of the bottom member whereby to secure the cover against accidental displacement relative to the bottom member.

13. A pack as claimed in claim 12 wherein the cover member consists of an area overlying the container portion of the bottom member and has a downwardly and outwardly extending side wall disposed out of contact with the food article and terminating in a projection adapted to be centered on and interlocked with said flange of the bottom member whereby to lock the cover against accidental displacement relative to the bottom member.

14. A pack for a pie or like contoured article of food, comprising top and bottom members, the bottom member constituting a container for the food article and the top member constituting a cover, both of said members having interlocking edge formations disposed outwardly beyond the upper edge of the food article and out of contact therewith, said edge formations being of such shape and in such relation to each other as automatically to center and positively interlock the top and bottom members against relative accidental displacement.

In testimony whereof we affix our signature.

JOHN M. HART.
MERLE P. CHAPLIN.